Nov. 20, 1928.

F. F. LEITER 1,692,554

DEVICE FOR ILLUMINATING ALL KINDS OF HOLLOW MEMBERS

Filed Jan. 22, 1924

Inventor
Friedrich Ferdinand Leiter
per *Kowatess*
Attorney.

Patented Nov. 20, 1928.

1,692,554

UNITED STATES PATENT OFFICE.

FRIEDRICH FERDINAND LEITER, OF VIENNA, AUSTRIA, ASSIGNOR TO JOSEF LEITER, FABRIK CHIRURGISCHER INSTRUMENTE, OF VIENNA, AUSTRIA, A COMPANY OF AUSTRIA.

DEVICE FOR ILLUMINATING ALL KINDS OF HOLLOW MEMBERS.

Application filed January 22, 1924, Serial No. 687,880, and in Austria February 1, 1923.

In consequence of the invention of the cystoscope for examining the bladder of a living person or animal it is obvious to obtain photographically the representations shown by the instrument. An electric incandescent lamp in the shape of a metallic filament lamp is employed as the source of light, whose intensity is kept within certain limits owing to its dimensions or size. Also the diameter and size of the optical arrangement is limited by the size of the urethra or urinary passage, and when conforming to these limitations it is not possible to increase the brightness beyond the presently known state in accordance with the knowledge of the optical rules or laws.

As already known for obtaining a photograhpic image, besides the brightness of the object to be reproduced and the conditions of opening the lens of the photographic apparatus, also the time of exposure has to be taken into consideration, which depends on the light-sensitiveness of the sensitized surface.

When taking photographs of the bladder, the brightness of the section of the latter, as well as also of the optical system for reproducing the image is limited. For the taking of such photographs of the bladder the longest time of exposure which is possible is determined by the physiological conditions of the bladder, which is analogous to the taking of photographs of moving objects. No matter how worthy of appreciation the results may be which are attained within these limits, it is impossible to term them satisfactory.

The ideal of the photographic reproduction of an object is color-photography. If it is desired to employ the same either directly or indirectly for the taking of photographs of the bladder, the mentioned limits cannot be overstepped when employing the known arrangements owing to the very considerably increased time of exposure required for the color-photography, and therefore it has heretofore been impossible to take photographs in colors of the bladder.

According to the present invention this problem is solved in that the principle of illumination is entirely altered. The source of light is disposed at the outside in such a manner, that for instance an electric arc lamp or any other convenient source of light is employed as the main source of light, while the incandescent lamp, used at present, remains within the bladder. By means of a convenient condenser system a thin beam of light is formed of the main source of light and is projected into the bladder with the aid of various optical auxiliary means (lenses, prisms and the like), in order to illuminate the part of the bladder of which it is intended to take a photograph. By employing a source of light of any desired strength and an interior incandescent lamp it is possible in the manner just described to increase the intensity of illumination of the object to be photographed to such degree, that very satisfactory photographs in colors are obtainable. The incandescent lamp, which in the hitherto common manner is introduced into the cavity, is necessary firstly in order to locate the part of the cavity to be photographed and to adjust the same in relation to this part before connecting the endoscope to the voluminous exterior source of light, which cannot be moved with ease, and secondly in order to increase the diffusing luminous power of the object to be photographed as excessively large interior means have to be employed in order to obtain the effect of an interior incandescent lamp if the latter be changed to an outside one.

However, the invention is not limited to the photographic reproduction, examination and radiation of the bladder or any other human or animal cavities and ducts or passages, into which optical systems or devices are introduced for examination or photographic objects, but the invention is applicable also for other kinds of hollow spaces or cavities, whose entry is very small compared with their sizes, such as for example for steam boilers, the cylinders of internal combustion engines and of steam engines, the barrel of a gun and so forth.

When employing the device according to the present invention economical advantages will result when examining hollow spaces or cavities (in which a useful result cannot be obtained with the cystoscope of known constructions) as any difficult and expensive dismantling can be avoided. For such examinations the illumination and examination may be carried out through separate introduction-openings or channels, in order to utilize to the utmost their interior dimensions.

Modes of carrying out the present invention are shown in section and by way of example on the accompanying sheet of drawings, in which:—

For therapeutic purposes the examination and illumination (in this case irradiation) may be accomplished at different times, and differently constructed optical systems or devices may be employed for the examination and the subsequent irradiation. A device constructed according to Fig. 1 is well suited for this object.

A designates a hollow member furnished with a neck or narrow passage B through which a tube E is introduced into the said member A, an optical system F for conveying the image being disposed within the tube E. H designates an inserted glow or incandescent lamp, D a main source of light and C a surface, for instance the retina of the eye, a ground or opal glass screen, a sensitized surface, a projection screen or the like, on which the image, projected by the optical system F, is produced. The rays of light emitted by the main source of light D are transmitted by the optical system F to the hollow member A.

Figure 1:
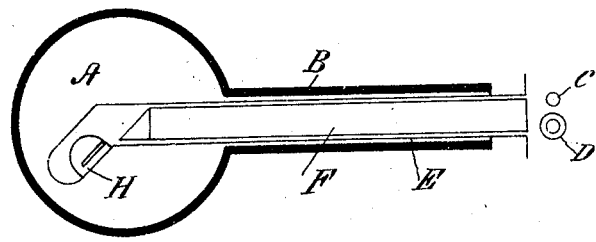
Fig. 1 is a sectional view of one form of the invention.
Figure 2:
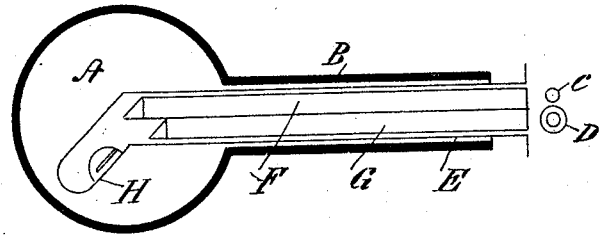
Fig. 2 is a sectional view of a modified form of the same.

Fig. 2 illustrates a device which is similar to the construction shown in Fig. 1, but in this case two tubular optical systems F and G are disposed within the tube E, the system F serving for conveying the image and the system G for transmitting the rays of light emitted by the main source of light D.

I claim—

1. A cystoscope comprising an ocular tubulus, an external source of light, an optical system for transmitting light from said source to the area to be examined, a second optical system for transmitting light from said area to the front end of said tubulus and a tubular member enveloping both optical systems.

2. A cystoscope comprising a hollow transparent tubular member having one closed end and one open end, a window near the closed end of said member, a source of light located adjacent the open end of said member, an optical system for transmitting light rays from said source to the area under examination, a second optical system for transmitting light rays from said area to a point adjacent the open end of said tubular member, and a second source of light disposed within the closed end of said tubular member for further illuminating the area under examination.

3. A device for examining the interiors of hollow bodies, comprising a hollow cylindrical member having one open end and one sealed end, a window near the closed end of said member, an incandescent lamp positioned within said cylindrical member near the sealed end, a powerful source of light positioned outside said tubular member, an optical system within said tubular member adapted to transmit light from said source of light to the area under examination and a second optical system within said tubular member adapted to transmit light from said area to a point adjacent the open end of said tubular member.

4. A device for illuminating all kinds of hollow members which are provided with an entry and whose examination, photography or irradiation is to be carried out from the outside, comprising in combination a tubular member adapted to be introduced into the hollow member, an incandescent lamp secured to the said tubular member near that end which is adopted to be introduced into the said hollow member, an optical system adapted to be introduced into the said tubular member, a main source of light disposed outside the latter and the entrance of the hollow member for illuminating the part of the hollow member to be reproduced, and another optical system also arranged in the said tubular member for transmitting an image to the outside.

In testimony whereof I have signed my name to this specification.

FRIEDRICH FERDINAND LEITER.